(12) United States Patent
Torii (10) Patent No.: US 7,213,865 B2
(45) Date of Patent: May 8, 2007

(54) BLOW MOLDED VEHICLE SUN VISORS AND METHODS OF MANUFACTURING SUCH SUN VISORS

(75) Inventor: Hidekazu Torii, Toyota (JP)

(73) Assignees: Kyowa Sangyo Co., Ltd., Toyota-Shi, Aichi-Ken (JP); Shinwa Seiko Co., Ltd., Toyota-Shi, Aichi-Ken (JP)

( * ) Notice: Subject to any disclaimer, the term of this patent is extended or adjusted under 35 U.S.C. 154(b) by 155 days.

(21) Appl. No.: 11/112,512

(22) Filed: Apr. 22, 2005

(65) Prior Publication Data

US 2005/0236865 A1    Oct. 27, 2005

(30) Foreign Application Priority Data

Apr. 23, 2004    (JP) .............................. 2004-128235

(51) Int. Cl.
   *B60J 3/00*    (2006.01)
(52) U.S. Cl. .................. 296/97.12; 296/97.1; 296/97.9
(58) Field of Classification Search ............... 296/97.9, 296/97.1, 97.12
See application file for complete search history.

(56) References Cited

U.S. PATENT DOCUMENTS 5,366,265 A  *  11/1994  Aymerich et al. ........ 296/97.12
5,967,588 A  *  10/1999  Collet et al. ............. 296/97.11
6,830,280 B2 *  12/2004  Sturt et al. ................. 296/97.9

FOREIGN PATENT DOCUMENTS

WO    WO 93-13957    7/1993

* cited by examiner

Primary Examiner—Dennis H Pedder
Assistant Examiner—Melissa A. Black
(74) Attorney, Agent, or Firm—Conley Rose, P.C.

(57) ABSTRACT

A blow molded vehicle sun visor (1) has a visor body (2) formed by a blow molding process. The visor body (2) has a hollow plate-shaped configuration defining an inner space. A bearing member (3) is positioned within the inner space of the visor body (2) during the blow molding process. A support rod (4) is inserted into the bearing me (3) in order to pivotally support the visor body (2). The bearing member (3) has at least one through hole (33, 34) formed therein and extending in a direction of thickness. The visor body (2) has at least one column (25) corresponding to the at least one through hole (33, 34) and formed integrally with the visor body (2). The at least one column (25) extends though the corresponding at least one through hole (33, 34) of the bearing member (3) in order to prevent the movement of the bearing Ryder (3) and to reinforce the visor body (2) with respect to the direction of thickness.

12 Claims, 10 Drawing Sheets

BLOW MOLDED VEHICLE SUN VISORS AND METHODS OF MANUFACTURING SUCH SUN VISORS

This application claims priority to Japanese patent application Ser. No. 2004-128235, the contents of which are incorporated herein by reference.

BACKGROUND OF THE INVENTION

1. Field of the Invention

The present invention relates to vehicle sun visors having hollow plate shaped visor bodies formed by blow molding processes.

2. Description of the Related Art

A blow molded vehicle sun visor is known, for example, by PCT International Publication WO93/13957 (i.e., corresponding to Japanese Laid Open Patent Publication No. 6-506424). The sun visor of this publication includes a hollow plate shaped visor body formed by a blow molding Fess, a bearing member inserted into the visor body dig the blow molding process, and a support rod inserted into the bearing member in order to rotatably support the visor body.

The visor body has a plurality of colt and a plurality of projections in order to restrict the movement of the bearing member. The columns are disposed in an upright manner within the hollow space of the visor body and extend in a direction of thickness of the visor body. The columns are respectively positioned adjacent to a left side and a right side of the bearing member so that the columns prevent the bearing member from moving in the left and right directions within a plane parallel to the surfaces of the sun visor body.

However, the columns can restrict the movement of the being member only with respect to the left and right dictions. Therefore, it is not possible to effectively limit the movement of the bearing member within all of the directions of a plane parallel to the surfaces of the sun visor body using the prior ant teaching.

SUMMARY OF THE INVENTION

It is accordingly an object of the present invention to teach improved blow-molded sun visors that can effectively limit the movement of the bearing members relive to the visor bodies.

In one aspect of the present teachings, blow molded vehicle sun visors are taught that include a visor body, a bearing member, and a support rod. A blow molding process forms the visor body. The visor body has a hollow plate shaped configuration defining an inner space. The bearing member is positioned within the inner space of the visor body during the blow molding process. The support rod is inserted into the bearing member in order to pivotally support the visor body. The bearing member has at least one through hole formed therein and extending in a direction of thickness of the visor body. The visor body has at least one column corresponding to the at least one through hole and formed integrally with the visor body during the blow molding process. The column(s) extends though the corresponding through hole(s) of the bearing member in order to prevent the movement of the bearing member and to reinforce the visor body with respect to the direction of thickness. For example, in order to prevent the movement of the bearing member, a plurality of columns may be provided in positions spaced apart from each other. In addition to or otherwise, the column(s) and the through hole(s) may have corresponding non-circular configurations.

Since the at least one column extends through the corresponding through hole formed in the bearing member in the direction of thickness of the visor body, the column(s) can effectively prevent the movement of the bearing member. In addition, the column(s) can be effectively and easily molded integrally with the visor body during the blow molding of the visor body.

In one embodiment, the visor body has a first sidewall and a second sidewall opposing to the first sidewall. During the blow molding process the column(s) is formed by a projection(s) inserted into the visor body from the side of the first sidewall in a direction towards the second sidewall. Consequently, an insertion hole(s) is formed by only the projection(s) in the first sidewall of the visor body and an insertion hole(s) is not formed in the second sidewall.

Because the insertion hole(s) is not formed in the second sidewall, the second sidewall is not degraded in appearance due to the formation of an insertion hole. Therefore, the sun visor can be suitably used as a non-outer-cover the sun visor. Thus, the fi sidewall (e.g., having the insertion hole(s)) may be positioned on the side of the sun visor that is not normally visible to the driver or the passenger (e.g., such as the side opposing the vehicle cabin ceiling when the sun visor is positioned in a storage position along the ceiling of the vehicle cabin). In this way, the appearance of the visor body may be maintained and not unduly degraded.

In addition, because the second sidewall of the visor body does not include any insertion hole(s), a favorable tactile impression of the visor body may be maintained when the sun visor body is grasped by the driver or a passenger. Therefore, the sun visor can be suitably used as a non-outer-cover type sun visor also in this respect.

Further, because the column(s) is formed by a projection(s) inserted from the side of the first sidewall of the visor body, the column(s) can be more easily formed in comparison with columns that are formed by projections inserted from both opposing sides of a visor body, as noted in PCT International Publication WO93/13957.

In another embodiment, the bearing member has a first side portion positioned along an inner surface of the first sidewall of the visor body and a second side portion positioned along an inner surface of the second sidewall of the visor body. The through hole(s) of the bearing member includes a first through hole(s) formed in the first side portion and a second through hole(s) formed in the second side portion. The first though hole(s) bas a diameter greater than a diameter of the corresponding projection to permit the insertion of the projection during the blow molding process. The second through hole(s) has a diameter smaller than the diameter of the corresponding projection(s). The column(s) formed by the projection(s) has a tubular portion, a bottom portion, and a filling portion. The tubular portion extends from the first sidewall of the visor body toward the second side portion of the bearing member, through the corresponding first through hole formed in the first side portion of the bearing member. The bottom portion closes one end of the tubular portion on the side of the second side portion of the bearing member and covers the corresponding second through hole formed in the second side portion of the bearing member. The filling portion extends from the bottom portion to the inner surface of the second sidewall of the visor body through the corresponding second through hole formed in the second side portion of the bearing member.

In this way, the projection(s) used for forming the column(s) extends through the first through hole(s) formed in the first side portion of the bearing member but does not extend through the second through hole(s) formed in the second side portion. Therefore, it is possible to prevent the potential bulging outward of the second sidewall due to the interaction of the projection(s) with the second sidewall. As a result, the appearance of the second sidewall may be favorably maintained.

In addition, the column(s) has a bottom portion that covers the corresponding second through hole formed in the second side portion of the bearing member. Therefore, the bottom portion may prevent the bearing member from moving in the direction of thickness of the visor body. Subsequently, the column(s) also serves to prevent the bearing member from moving in the direction of thickness of the visor body.

In an alternative embodiment, the bearing member has a side portion positioned along an inner surface of the second sidewall of the visor body. The through hole(s) of the bearing member is formed in the side portion and has a diameter smaller than the diameter of the corresponding projection, which is inserted into the visor body from the side of he first sidewall during the blow molding process. The column(s) formed by the projection(s) has a tubular portion, a bottom portion, and a filling portion. The tubular portion extends from the first sidewall of the visor body towards the side portion of the bearing member. The bottom portion closes one end of the tubular portion on the side of the side portion of the bearing member and covers the corresponding through hole formed in the side portion of the bearing member. The filling portion extends from the bottom portion to the inner surface of the second sidewall of the visor body through the corresponding through hole formed in the side portion of the bearing member.

In this way, the projection(s) inserted into the visor body from the side of the first sidewall for forming the column(s) does not extend through the through hole(s) formed in the side portion of the bearing member. Also with this arrangement, it is possible to prevent the potential bulging outward of the second sidewall due to interaction of the projection(s) with the second sidewall. As a result, the appearance of the second sidewall can be favorably maintained.

In addition, in the same manner as the above embodiment, the column(s) has a bottom portion that covers or blocks the corresponding through hole formed in the side portion of the bearing member. Therefore, the bottom portion may prevent the bearing member from moving in the direction of thickness of the visor body. Subsequently, the column(s) also serves to prevent the bearing member from moving in the direction of thickness of the visor body.

In another aspect of the present teachings, vehicle sun visors are taught that include a hollow visor body defining an inner space and having a first sidewall and a second sidewall opposing to the first sidewall. A bearing member is disposed within the inner space of the visor body and includes at least one through hole formed therein. A support rod is inserted into the bearing member via the visor body in order to pivotally support the visor body. At least one column is formed integrally with at least one of the first and second sidewalls of the visor body and is engagingly inserted into a corresponding through hole of the bearing member. As a result, the bearing member is prevented from moving at least within a plane substantially parallel to the first and second sidewalls of the visor body.

The column(s) can therefore effectively prevent the bearing member from moving in a direction parallel to the first and second sidewalls of the visor body.

In one embodiment the column(s) has a first end joined to the first sidewall and a second end opposite to the first end and joined to the second sidewall. The column(s) may include a tubular portion with an open end defining the first end and a closed end defining the second end.

In another embodiment, the bearing member has a first side portion and a second side portion opposite the first side portion. The first side portion is positioned along an inner surface of the first sidewall of the visor body. The second side portion is positioned along an inner surface of the second sidewall of the visor body. The through holes of the bearing member includes at least one first through hole formed in the first side portion of the bearing member and at least one corresponding second through hole formed in the second side portion.

The diameter of the first through hole(s) may be substantially equal to the diameter of the second through hole(s). The outer diameter of the column(s) may be greater than or substantially equal to the inner diameter of the first through hole(s) and the inner diameter of the second through hole(s), allowing the column to extend through both of the corresponding first through hole and the second through hole.

Alternatively, the first through hole(s) may have a first diameter substantially equal to the outer diameter of the column(s) while the second through hole(s) may have a second diameter that is smaller than the first diameter. The second end of the corresponding column subsequently blocks or covers the second through hole(s). The second end of the column(s) has an extension protruding from the second end to the second sidewall of the visor body via the corresponding second through hole(s).

In another embodiment the bearing member has a side portion positioned along an interior surface of the second sidewall of the visor body. A through hole(s) is positioned in the side portion of the bearing member. The through hole(s) has a diameter smaller than diameter of the corresponding column so that the second end of the corresponding column blocks or covers through hole(s). The second end of the column(s) has an extension protruding from the second end to the second sidewall of the visor body via the corresponding through hole(s).

In another aspect of the present teachings, methods of manufacturing vehicle sun visors are taught that may include the steps of forming a tubular film, inserting a bearing member into the tubular film, wherein the bearing member has at least one through hole. Additional steps may include blow molding the tubular film into a visor body having an interior space with an opposing first sidewall and a second sidewall and subsequently molding at least one column in the visor body so that the column(s) extends between the first and second sidewalls of the visor body through the corresponding through hole formed in the bearing member. Another step may include inserting a support rod into the bearing member through the visor body.

In one embodiment, the step of molding the column(s) comprises moving at least one projection into the molded visor body from the side of the first sidewall toward the second sidewall. The column(s) includes a tubular portion defining a space substantially conforming to the configuration of the corresponding projection. The tubular portion has an open first end and a closed second end respectively joined to the first and second sidewalls of the visor body.

Preferably, the projection(s) is formed on one of die halves of a blow molding die that is used to blow mold the visor body.

In one embodiment, the bearing member has a first side portion and a second side portion opposing the first side portion. The first side portion of the bearing member is positioned along an inner surface of the first sidewall. The second side portion of the bearing member is adapted to be positioned along an inner surface of the second sidewall. The first side portion has at least one first through hole formed therein. The second side portion has at least one corresponding second through hole formed therein. In this connection, the step of molding the column(s) further includes moving the projection(s) into a corresponding first through hole and further into a corresponding second through hole.

In an alternative embodiment, the diameter of the second through hole(s) is smaller than the outer diameter of a projection(s). With regard to this configuration, the step of molding the column(s) further includes moving the projection(s) into a corresponding first through hole to a position adjacent to a corresponding second through hole. The bottom portion of the column may then block or cover the corresponding second through hole. A projection of material from the bottom portion fills the second through hole and is consequently bonded to the inner wall of the second sidewall of the visor body.

In another embodiment, the bearing member has a side portion positioned along an inner surface of the second sidewall. The side portion has at least one through hole formed therein. The diameter of the through hole(s) is smaller than the outer diameter of the at least one projection. In this connection with this configuration, the step of molding the column(s) further includes moving the projection(s) to a position adjacent to the corresponding through hole of the side portion. The bottom portion of the column blocks or covers the corresponding through hole and a part of the material of the bottom portion fills the through hole and is bonded to the inner wall of the second sidewall.

DETAILED DESCRIPTION OF THE INVENTION

Each of the additional features and teachings disclosed above and below may be utilized separately or in conjunction with other features and teachings to provide improved vehicle sun visors and methods of manufacturing such sun visors. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

(First Representative Embodiment)

Figure 1:
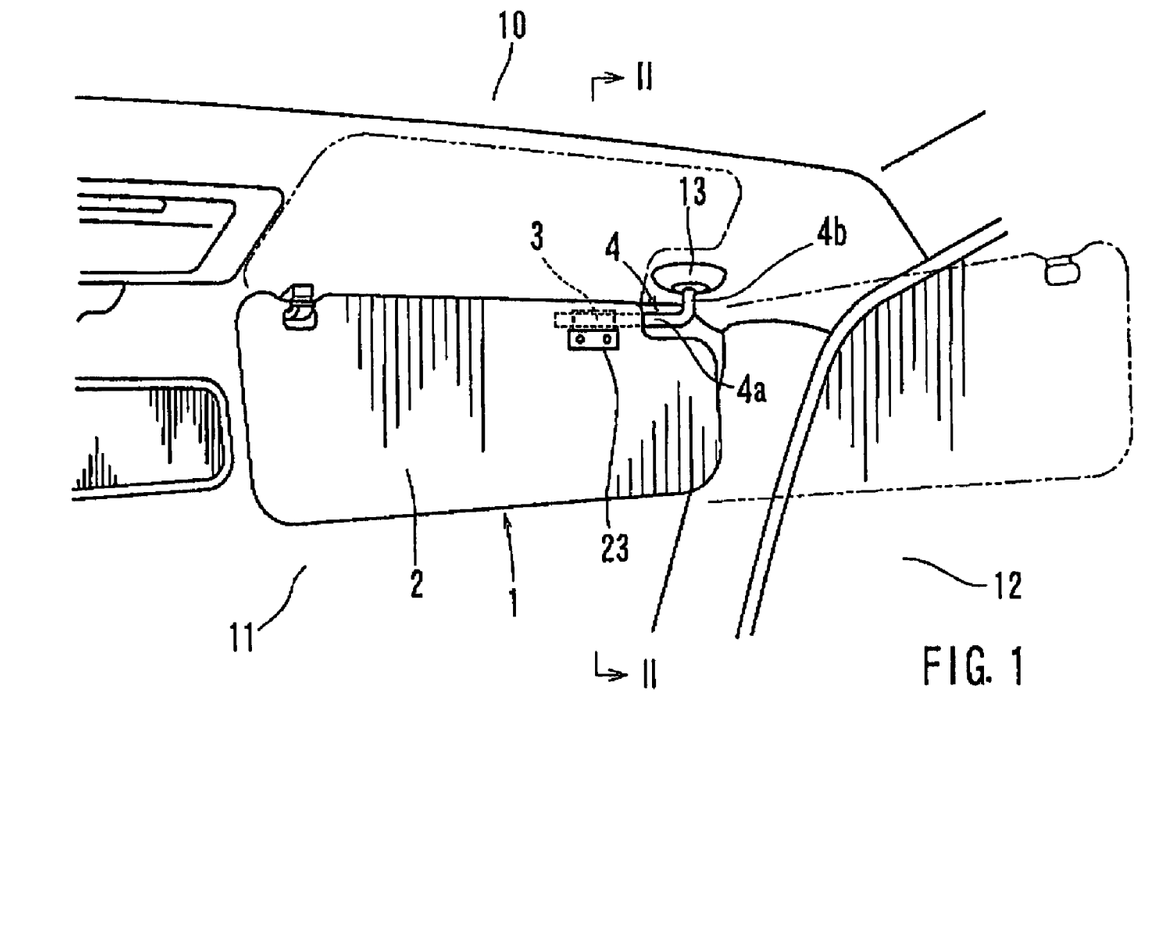
FIG. 1 is a perspective view of a sun visor according to a first representative embodiment and showing the sun visor mounted to a ceiling of a vehicle cabin.

A first representative embodiment of the present invention will now be described with reference to FIGS. 1 to 6. Referring to FIG. 1, a representative sun visor 1 includes a plate-shaped sun visor body 2, a bearing member 3 disposed within the sun visor body 2, and a support rod 4 inserted into the bearing member 3.

The support rod 4 has a substantially L-shaped configuration and includes a horizontal rod portion 4a and a vertical rod portion 4b. The horizontal rod portion 4a is inserted into the visor body 2 from one end on one side of the visor body 2 and then into the bearing member 3. The bearing member 3 rotatably supports the horizontal rod portion 4a. The vertical rod portion 4b is rotatably mounted to the vehicle ceiling surface 10 via a bracket 13 so that the vertical rod portion 4b can rotate about a vertical axis.

With this arrangement, the visor body 2 can move between a light-shielding position adjacent to a vehicle windshield 11 and a storage position adjacent to the vehicle ceiling surface 10, as the visor body 2 pivots about the horizontal rod portion 4a. The visor body 2 can also move between a light-shielding position and a side position adjacent to the side glass 12 as the visor body 2 pivots about an axis of the vertical rod portion 4b together with the support rod 4.

Figure 2:
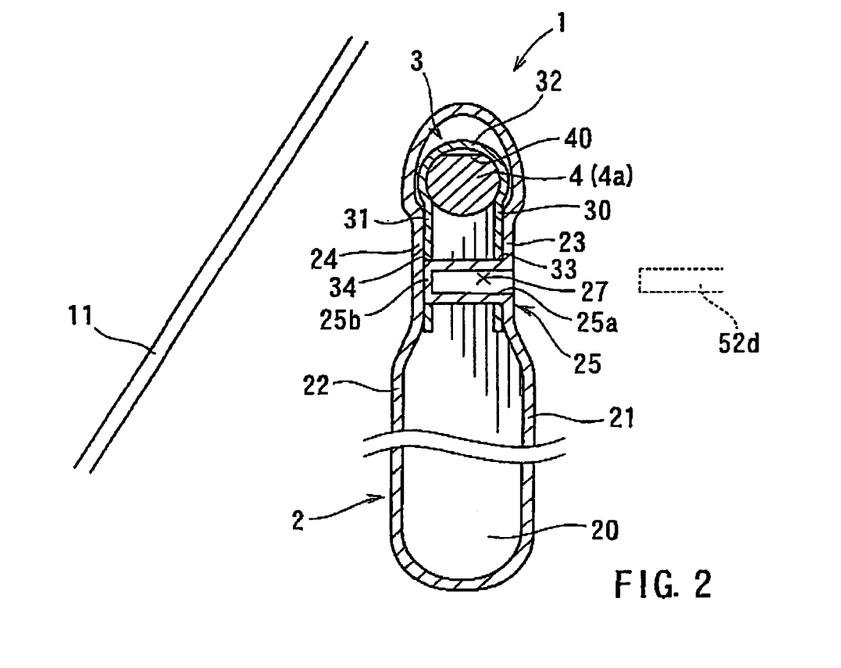
FIG. 2 is a cross-sectional view taken along line II—II in FIG. 1.
Figure 3:
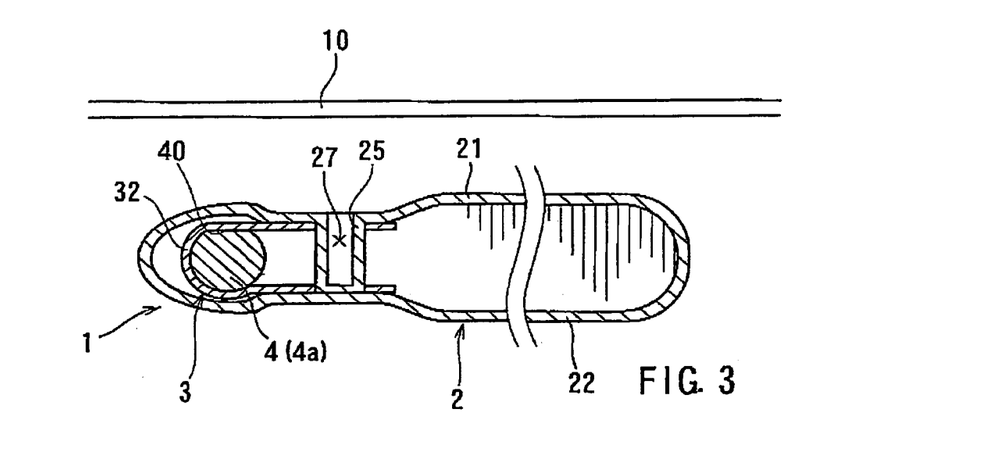
FIG. 3 is a view similar to FIG. 2 but showing the storage position of the sun visor.

As shown in FIG. 2, the visor body 2 has a hollow plate-shaped configuration and is formed via a blow molding process. The visor body 2 includes a first sidewall 21, a second sidewall 22 opposing the first sidewall 21, and a hollow space 20 defined between the first sidewall 21 and the second sidewall 22. The first sidewall 21 and the second sidewall 22 respectively define a surface opposing to a driver and a surface opposing to the windshield 11 when the visor body 2 is in a light-shielding position (see FIG. 2).

The first sidewall 21 and the second sidewall 22 respectively have concave portions 23 and 24, that are each indented toward the hollow space 20. As shown m FIG. 1, the concave portions 23 and 24 are positioned to oppose the bearing member 3 in order to prevent the movement of the bearing member 3 in the direction of thickness of the visor body 2 (see FIG. 2).

Figure 4:
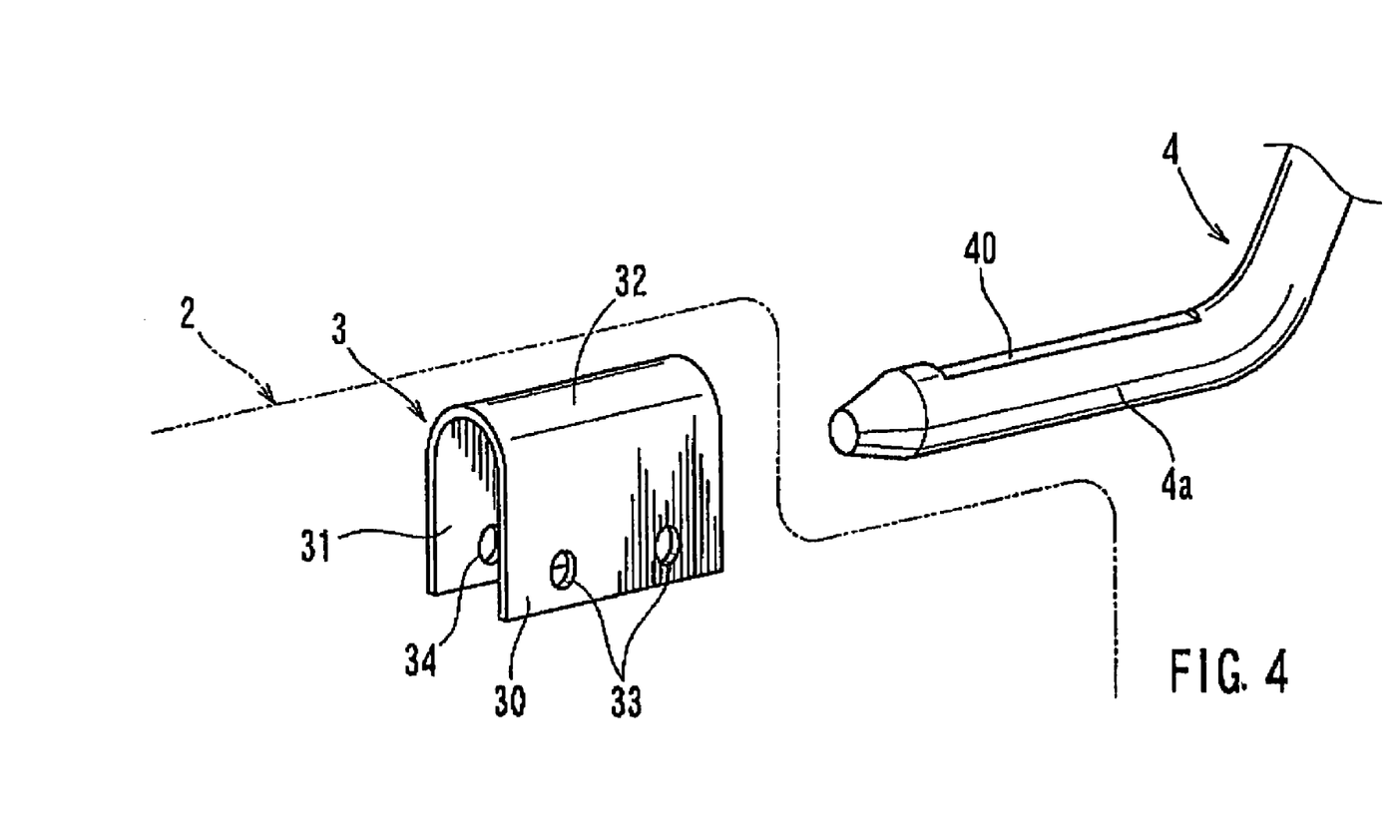
FIG. 4 is a perspective view of a bearing member and a support rod of the sun visor.

As shown in FIG. 4, the being member 3 is formed by bending a spring plate to have a substantially U-shaped cross-sectional configuration, so that the bearing member 3 has a first side portion 30, a second side portion 31, and a resiliently deformable portion 32. As shown in FIG. 2, the first side portion 30 is positioned on the side of the first sidewall 21 of the visor body 2 so as to contact an interior wall surface of the concave portion 23. The second side portion 31 is positioned on the side of the second sidewall 22 so as to contact an interior wall surface of the concave portion 24. In this way, the bearing member 3 is prevented or restrained from moving in the direction of thickness of the visor body 2.

As shown in FIGS. 2 and 4, a plurality of through holes 33 and a corresponding plurality of through holes 34 are respectively formed in the first side portion 30 and the second side portion 31 throughout the thickness of these portions. Two through holes 33 and two through holes 34 are provided in this representative embodiment. Projections or columns 25 are formed in the visor body 2 to extend through a corresponding pair of holes comprising one through hole 33 and one through hole 34.

Each of the columns 25 has a tubular portion 25a and a closed bottom 25b at one end of the tubular portion 25a. The tubular portion 25a extends from the concave portion 23 of the first sidewall 21 toward the second sidewall 22 through the corresponding pair of through holes 33 and 34 of the bearing member 3. The closed bottom 25b is positioned on the side of the second sidewall 22. In this representative embodiment, the bottom 25b is positioned within the through hole 34 and is secured to an interior wall surface of the concave portion 24 of the second sidewall 22. In this way, the columns 25 also serve to reinforce the visor body 2 in the direction of the thickness of the visor body 2.

The resiliently deformable portion 32 of the bearing member 3 has a U-shaped cross section and joins the upper end of the first side portion 30 to the upper end of the second side portion 31, as shown in FIG. 2. In the state shown in FIG. 2, the resiliently deformable portion 32 is positioned on the upper side of the concave portions 23 and 24. The horizontal rod portion 4a of the support rod 4 is inserted into the resiliently deformable portion 32 while the resiliently deformable portion 32 is resiliently enlarged in the widthwise direction.

As shown in FIG. 4, an upper end surface of the horizontal rod portion 4a is chamfered to form a flat surface 40. As the visor body 2 pivots together with the bearing member 3 about the horizontal rod portion 4a from the light-shielding position shown in FIG. 2 to the storage position shown in FIG. 3, the resiliently deformable portion 32 contacts with the flat surface 40 in surface-to-surface contact relationship. As a result, the visor body 2 can be resiliently held in a storage position by the resiliently deformable portion 32. In addition, the resiliently deformable portion 32 cooperates with the flat surface 40 to force the visor body 2 towards the storage position when the visor body 2 has been pivoted from a light-shielding position toward the storage position.

Figure 5:
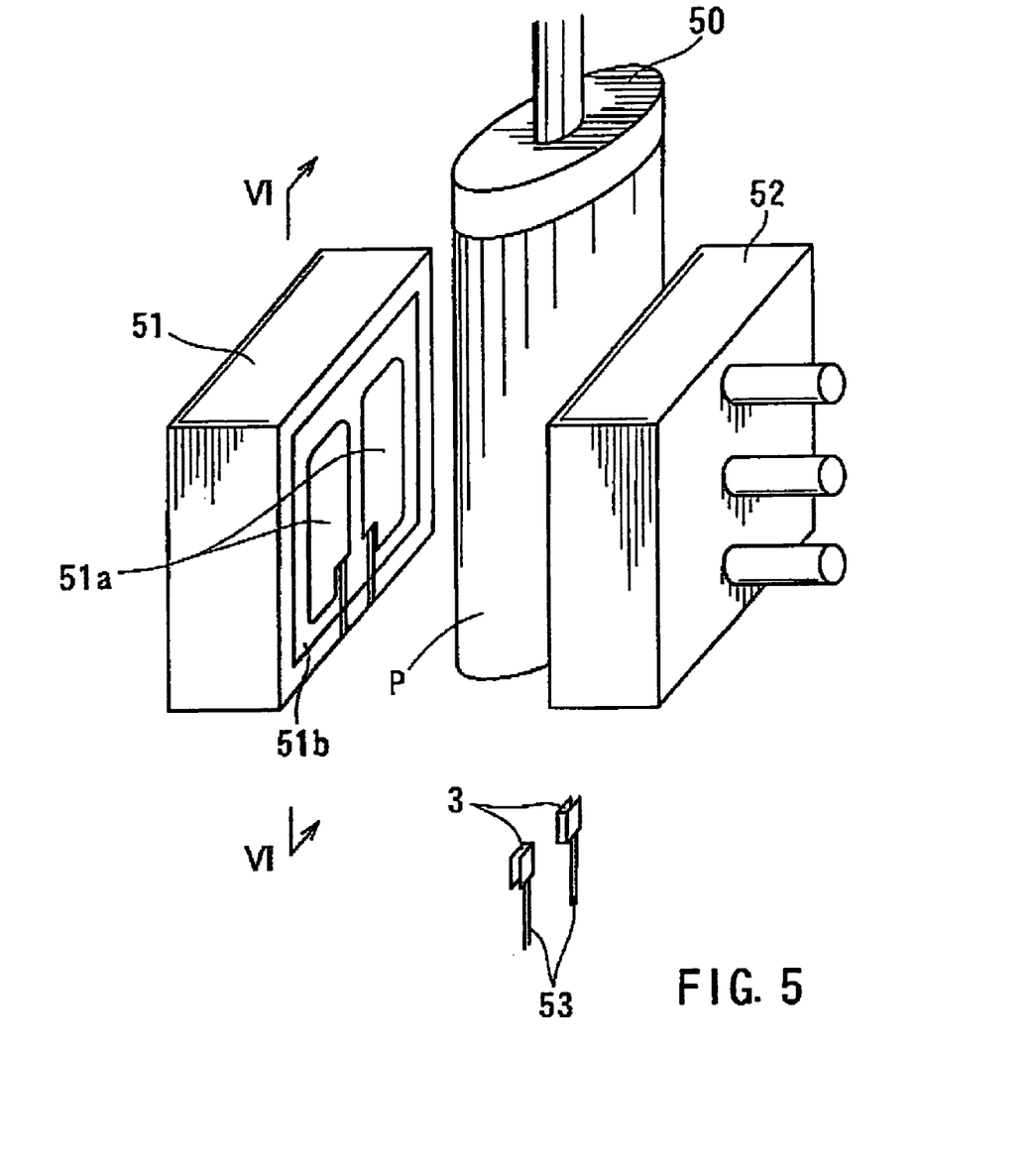
FIG. 5 is a perspective view of a molding die and an extruder and illustrating a representative method for manufacturing the sun visor.
Figure 6:
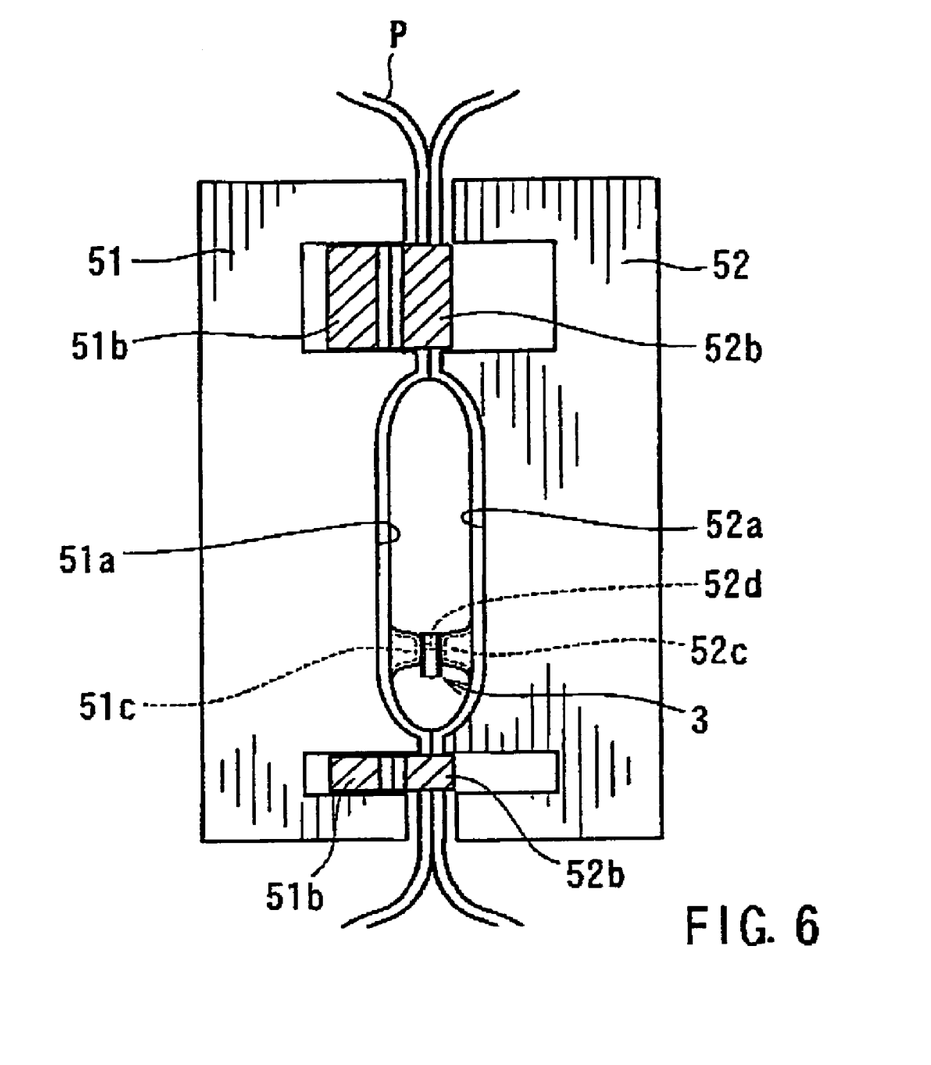
FIG. 6 is a cross-sectional view taken along line VI—VI in FIG. 5.

A representative method of manufacturing a representative sun visor 1 will now be described with reference to FIGS. 5 and 6. The operation shown in these figures is an operation for simultaneously molding a plurality of visor bodies 2 (e.g., two visor bodies 2 in this representative method). First, a resin material for molding the visor bodies 2 is heated and plasticized in a known manner. Then, an extruder 50 extrudes the plasticized resin in a tubular form, obtaining a tubular extruded resin P generally called a "parison."

Blowing nozzles 53 and the bearing members 3 attached thereto are then inserted into the parison P from a lower opening of the parison P. Alternatively, the parison P may be dropped downward to receive the blowing nozzles 53 and the bearing members 3.

A pair of mold halves 51 and 52 are thereafter moved so as to close with the parsion P positioned therebetween. Subsequently, a gas, such as air, may be blown into the parison P via the blowing nozzles 53. The parison P is inflated to follow the configurations of the cavities 51a and cavities 52a respectively formed within the closed mold halves 51 and 52, as shown in FIG. 6.

A raised portion 51c is formed near the bottom of each of the cavities 51a of the mold halves 51 and extends toward the corresponding cavity 52a of the mold halves 52. Similarly, a raised portion 52c is formed near the bottom of each of the cavities 52a of the mold halves 52 in a position opposite to the corresponding raised portion 51c and extends toward the corresponding cavity 51a of the mold halves 51. In addition, a projection 52d is formed on the raised portion 52c and extends toward the raised portion 51c opposing thereto. Therefore, the concave portions 23 and 24 of the visor body 2 shown in FIG. 2 may be respectively formed by the raised portions 51c and 52c. The column 25 of the visor body 2 may be formed by the projection 52d. In this connection, during the mold closing operation, the projection 52d moves into the parison P from the side corresponding to the first sidewall 21 and extends through the corresponding through hole 33 and further through the corresponding through hole 34 of the bearing member 3.

Thereafter, slidable mold parts 51b and 52b respectively provided on the mold halves 51 and 52 are moved in order to cut or trim the surplus portion of the parison P. More specifically, the slidable mold parts 51b and 52b are respectively configured to correspond to the outer peripheral portions of the cavities 51a and 52a. The slidable mold parts 51b and 52b may move in a depth or thickness direction of the cavities 51a and 52a in order to cut the surplus portion of the parison P from around the cavities 51a and 52b.

Thereafter, the mold halves 51 and 52 are cooled to solidify the molded material and are then opened in order to take out the molded products (i.e., the visor bodies 2). The blow molding process of the sun visors bodies 2, each having a bearing member 3 positioned within the hollow space 20, is thus completed. Finally, the support rod 4 is inserted into each bearing members 3 (see FIG. 2).

In this representative embodiment, the outer surface of the visor body 2 is not covered with a separate outer cover. In other words, the representative sun visor 1 is configured as, but not limited to, a non-outer-cover type sun visor.

According to the representative sun visor 1 and the representative method of manufacturing the sun visor 1, two columns 25 are provided, each extending though the corresponding through holes 33 and 34 formed in the bearing member 3. Therefore, the columns 25 may prevent the movement of the bearing member 3 in any direction within a plane parallel to the surfaces of the sun visor body 2. As a result, potential production of any abnormal sound caused by the movement of the bearing member within the sun visor body 2 is limited or inhibited because the columns 25 effectively prevent the bearing member 3 from moving relative to the sun visor body 2. In addition, a sun visor body 2 having columns 25 can be easily manufactured since the columns 25 are internally molded with the visor body 2 during the blow molding process of the visor body 2.

In addition, as shown in FIG. 2, the columns 25 are formed by projections 52d that are inserted into the visor body 2 from the side of the first sidewall 21 toward the second sidewall 22 to form insertion holes 27 that are only open on the side of the first sidewall 21. No insertion holes or openings are formed on the side of the second sidewall 22. Therefore, the appearance of the second sidewall 22 is not degraded or deteriorated, since no insertion holes are provided in the second sidewall 22. This is suitable for the representative sun visor 1 that is configured as a non-outer-cover type sun visor. Preferably, the first sidewall 21 having the insertion holes 27 may be positioned so as to oppose the vehicle ceiling surface 10 when the sun visor 1 is in a storage position With this arrangement, the degradation of the overall appearance of the sun visor 1 during typical use can be minimized.

Further, because the columns 25 are formed by the projections 52$d$ inserted into the visor body 2 from one side thereof, the columns 25 can be more easily formed in comparison with the conventional construction of the PCT International Publication WO93/13957 noted in the description of the Related art. The Related art publication requires projections inserted into the visor body towards each other from both sides of the sun visor body.

The second to fifth representative embodiments will now be described with reference to FIGS. 7 to 11. The second to fifth representative embodiments are modifications of the first representative embodiment. Therefore, in FIGS. 7 to 11, like members are given the same reference numerals and the description of these members will not be repeated.

(Second Representative Embodiment)

The second representative embodiment will now be described with reference to FIG. 7. The second representative embodiment differs from the first representative embodiment in that the bearing member 3 has smaller through holes 38. With respect to this situation, columns 26, corresponding to the previously described columns 25, are configured differently than the columns 25. Therefore, the second representative embodiment will be described mainly in connection with the configurations that are different than the first representative embodiment.

Figure 7:
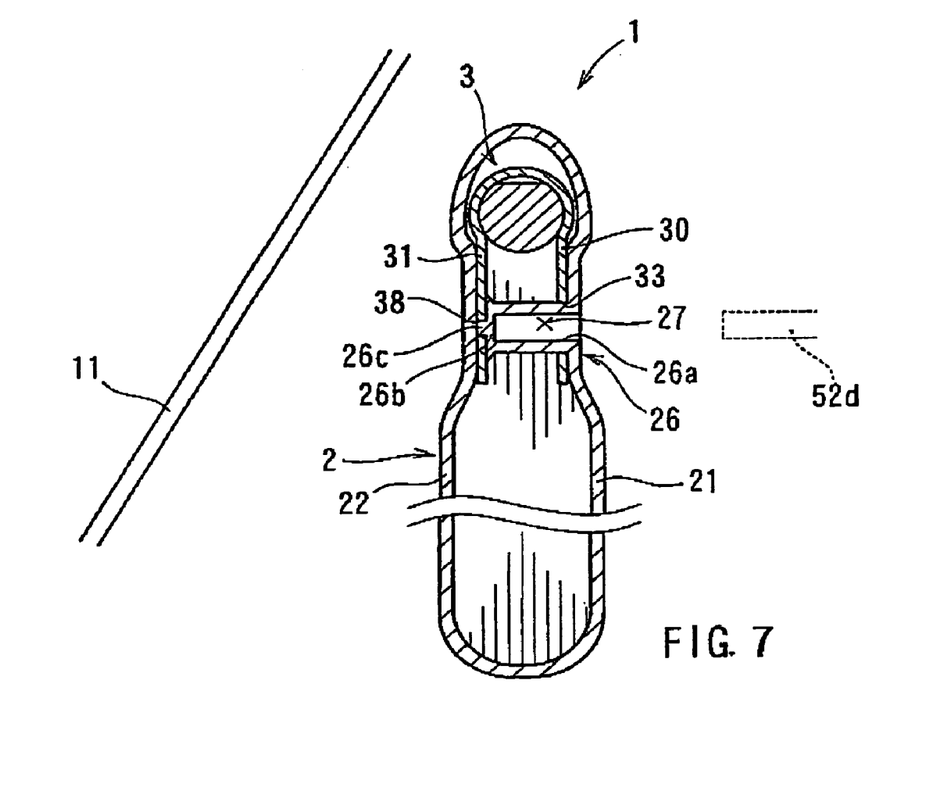
FIG. 7 is a sectional view similar to FIG. 2 but showing a second representative embodiment.

Referring to FIG. 7, the through holes 38 formed in the second side portion 31 have an inner diameter smaller than the inner diameter of the through holes 33 formed in the first side portion 30. In addition, the inner diameter of the through holes 38 is smaller than the outer diameter of the projections 52$d$ provided in the mold half 52 for forming the columns 26 (see FIG. 6). Therefore, during the molding process the projections 52$d$ extend through the through holes 33 but do not extend though the through holes 38. In this way, the protruding or inserting distance of the projections 52$d$ is limited so as to not extend beyond the second side portion 31.

With this arrangement, each column 26 is configured to have a tubular portion 26$a$, a bottom portion 26$b$, and an insertion portion 26$c$. The tubular portion 26$a$ extends from the first sidewall 21 of the visor body 2 to a position adjacent to the interior surface of the second side portion 31 of the bearing member 3. The bottom portion 26$b$ serves like a molten resin tundish and closes one end of the tubular portion 26$a$ while allowing the blow molded material to form an insertion portion 26$c$. The insertion portion 26$c$ extends from the bottom portion 26$b$ to the second sidewall 22, filling the corresponding through hole 38 and bonding to the interior surface of the concave portion 24 of the second sidewall 22 of the visor body 2.

According to the second representative embodiment described above, the bearing member 3 has the first side portion 30 and the second side portion 31 in the same manner as in the bearing member described in the first representative embodiment. However, the second side portion 31 of the bearing member 3 has through holes 38 that are smaller in diameter than the outer diameter of the projections 52$d$.

Therefore, the projections 52$d$ for forming the columns 26 can be inserted into the through holes 33 of the first side portion 30 of the bearing member 3 but cannot go through the through holes 38 of the second side portion 31. With this arrangement, it is possible to prevent the projections 52$d$ from applying forces to bulge the second side portion 31 of the visor body 2 outward. As a result, the appearance of the second sidewall 22 of the visor body 2 may be favorably maintained.

In addition, each column 26 has a bottom portion 26$b$ that blocks or covers the corresponding through hole 38 of the second side portion 31 of the bearing member 3. Therefore, the bottom portion 26$b$ serves to prevent the bearing member 3 from moving in the direction of thickness of the visor body 2. In this way, the columns 26 also serve to prevent the bearing member 3 from moving in the direction of thickness in addition to the directions parallel to the surface of the visor body 2.

(Third Representative Embodiment)

Figure 8:
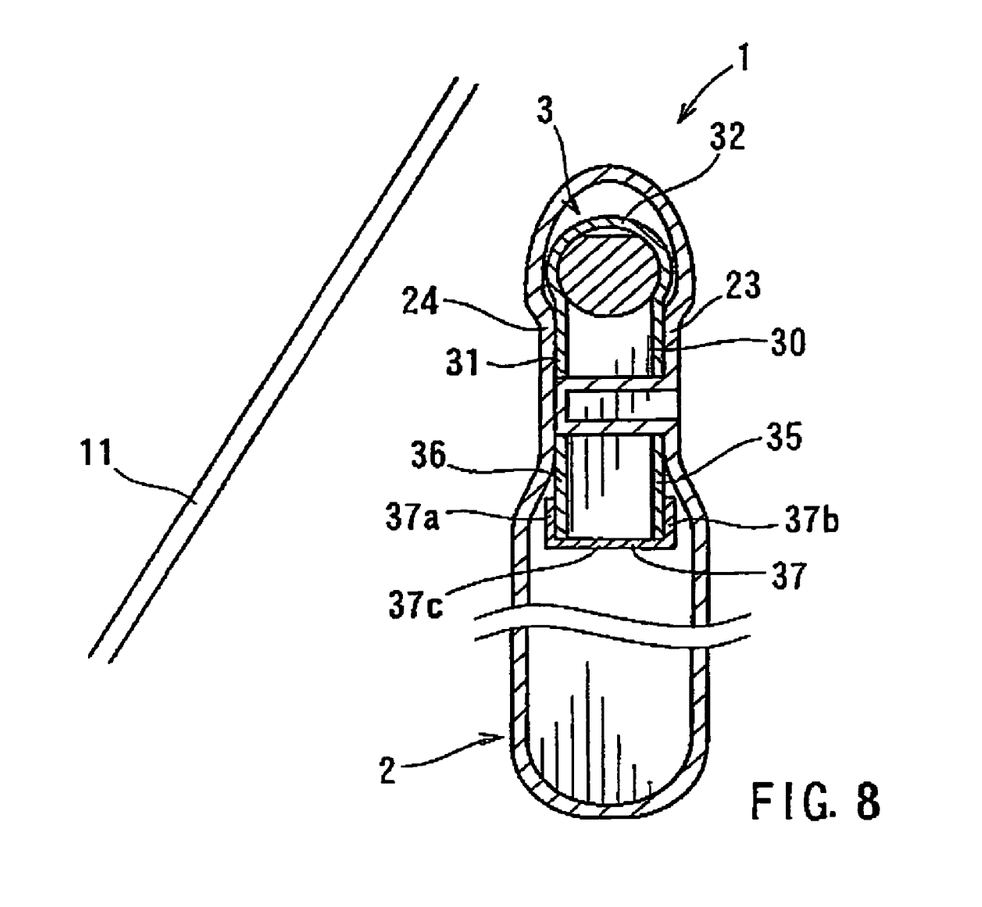
FIG. 8 is a sectional view similar to FIG. 2 but showing a third representative embodiment.

The third representative embodiment will now be described with reference to FIG. 8. The third representative embodiment differs from the first representative embodiment in that the bearing member 3 has a limiting member 37 for limiting the opening or separation of the bearing member 3. Therefore, the third representative embodiment will be described mainly in connection with the configurations that are different than the first representative embodiment.

The first side portion 30 and the second side portion 31 of the bearing member 3 respectively have integrally formed extensions 35 and 36 that extend downward (as viewed in FIG. 8) beyond the concave portions 23 and 24. The limiting member 37 is attached to the extensions 35 and 36 in order to limit the opening distance between the extensions 35 and 36. For example, the distance between the extensions 35 and 36 may be limit so as to not exceed the distance shown in FIG. 8.

Preferably, the limiting member 37 is made of spring plate and includes a pair of legs 37$a$ and 37$b$ extending along the outer side surfaces of the extensions 35 and 36. A connecting portion 37$c$ interconnects the legs 37$a$ and 37$b$.

(Fourth Representative Embodiment)

The fourth representative embodiment will now be described with reference to FIGS. 9 and 10. The fourth representative embodiment differs from the first representative embodiment in that a bearing member 6, corresponding to the bearing member 3 of the first representative embodiment, includes a retainer member 60 and a biasing member 61. Therefore, the fourth representative embodiment will be described mainly in connection with the configurations that are different than the first representative embodiment.

The retainer member 60 and the biasing member 61 are respectively made of spring plates, such as steel plates for example, which are bent to have desired configurations. The retainer member 60 has a substantially U-shaped cross-sectional configuration and includes a first side portion 60$a$, a second side portion 60$b$, and a joint portion 60$c$ that interconnects the first side portion 60$a$ to the second side portion 60$b$.

The first side portion 60$a$ is adapted to contact the inner side surface of the concave portion 23 of the visor body 2. The second side portion 60$b$ is adapted to contact the inner side surface of the concave portion 24. With this arrangement, the retainer member 60 is prevented or inhibited from moving in the direction of thickness of the visor body 2 through the interaction with the concave portions 23 and 24.

The first side portion 60a of the retainer member 60 has a plurality of through holes 60f and a plurality of mount holes 60d. Similarly, the second side portion 60b has a plurality of through holes 60g and a plurality of mount holes 60e. In this representative embodiment, each of the through holes 60f, the though holes 60g, the mount holes 60d, and the mount holes 60e, are provided in quantities of two. Each of the columns 25 of the visor body 2 is inserted into a pair of corresponding through holes 60f and 60g. Therefore, the retainer member 60 is prevented from moving relative to the visor body 2 in any direction within a plane parallel to the surfaces of the visor body 2.

The mount holes 60d and 60e have elongated configurations in a horizontal direction and are adapted to receive corresponding mount portions 61d and 61e of the biasing member 61. Through the interface of the mount holes 60d and 60e and the mount portions 61d and 61e, the biasing member 61 can be mounted to the retained member 60.

The biasing member 61 generally has a fixing portion 61a, a pair of resiliently deformable portions 61b, and a pair of contact portions 61c. The mount portions 61d are formed on the front edge of the fixing portion 61a so as to be received within the mount holes 60d. The mount portions 61e are formed on the rear edge of the fixing portion 61a so as to be received within the mount holes 60e. Therefore, the biasing member 61 can be reliably fixed in position relative to the retainer member 60.

The resiliently deformable portions 61b are respectively positioned on the left side and the right side of the biasing member 61. More specifically, the resiliently deformable portions 61b are respectively bent back upon themselves from the right and left sides toward the center of the biasing member 61. The resiliently deformable portions 61b are then again bent back upon themselves from positions adjacent to the center of the biasing member 61 towards the right and left sides. The contact portions 61c are integrally formed with the upper ends of the resiliently deformable portions 61b.

Figure 10:
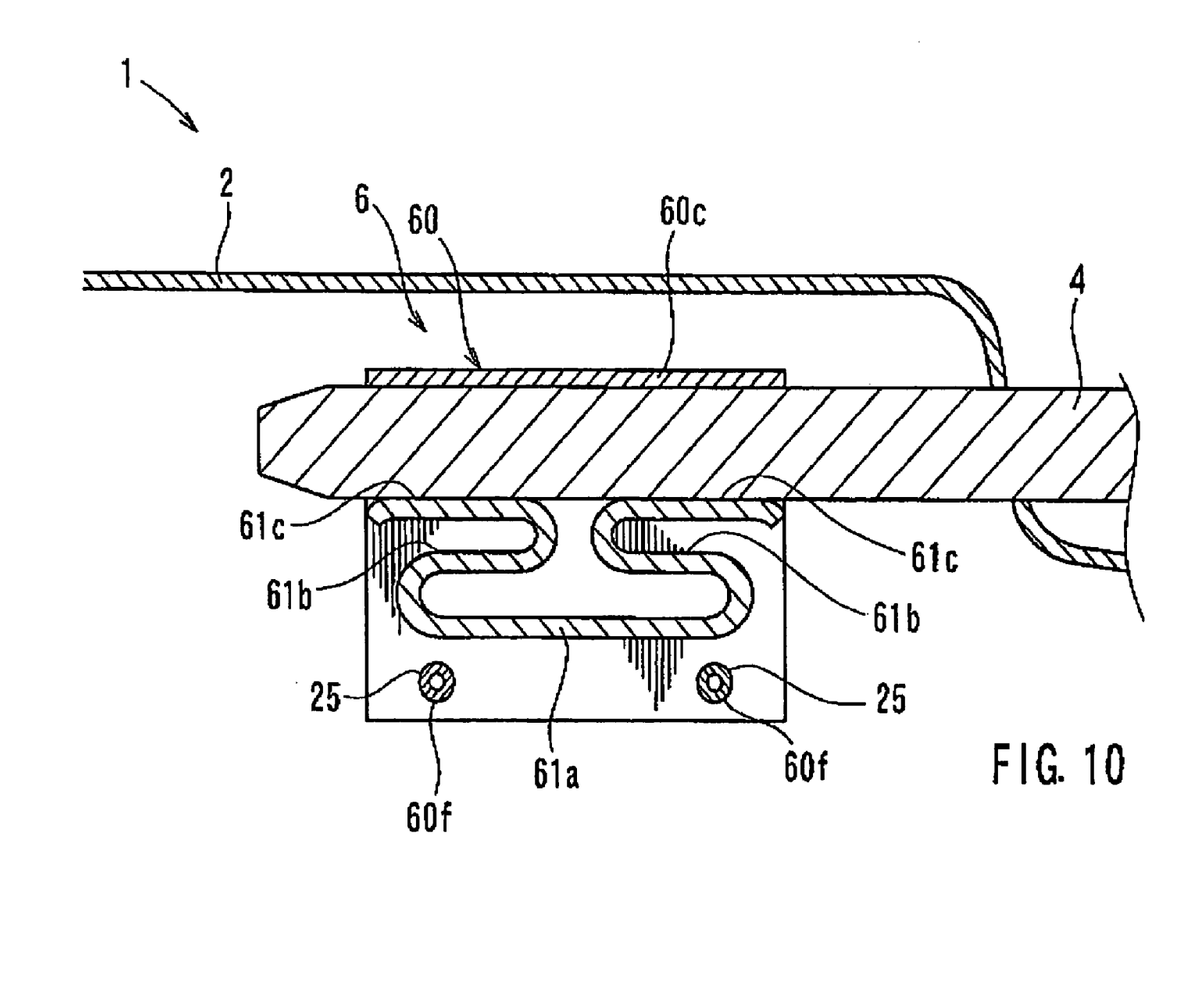
FIG. 10 is an enlarged vertical cross-sectional view of a part of the sun visor around the bearing member of the fourth representative embodiment.

As shown in FIG. 10, the horizontal shaft portion 4a of the support rod 4 is inserted between the contact portions 61c of the biasing member 61 and the joint portion 60c of the retainer member 60. The support rod 4 resiliently deforms the biasing member 61. Therefore, the biasing member 61 biases the support rod 4 upward, as viewed in FIG. 10, so that the support rod 4 is pressed against the joint portion 60c.

Figure 9:
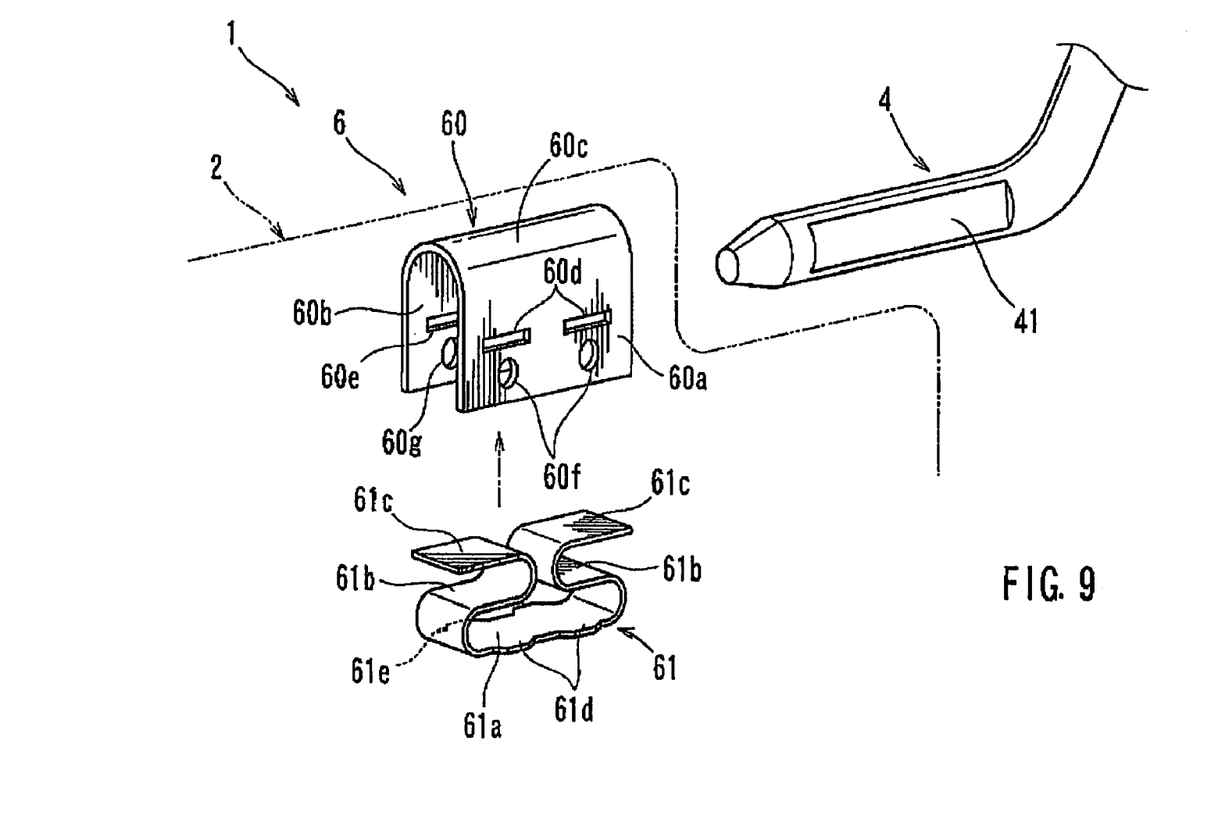
FIG. 9 is an exploded perspective view of a bearing member and a support rod of a sun visor according to a fourth representative embodiment.

As shown in FIG. 9, the horizontal shaft portion 4a is cut out or chamfered to form a flat surface 41 on the side opposing the driver or the passenger. Therefore, the visor body 2 can be resiliently held in a storage position by the biasing force of the biasing member 61. In addition, the biasing member 61 may bias the visor body 2 toward the storage position when the visor body 2 has been pivoted from a light-shielding position towards the storage position.

(Fifth Representative Embodiment)

Figure 11:
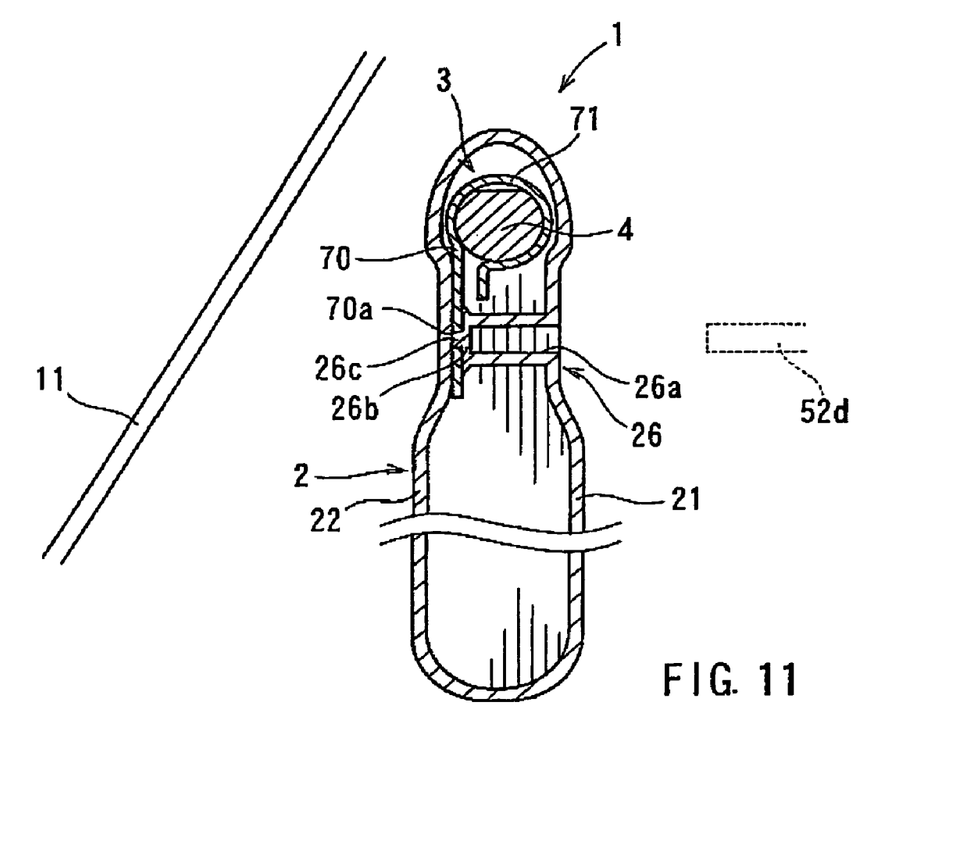
FIG. 11 is a cross-sectional view similar to FIG. 2 or 7 but showing a fifth representative embodiment.

The fifth representative embodiment will now be described with reference to FIG. 11. The fifth representative embodiment is similar to the second representative embodiment but differs from the second representative embodiment in that the bearing member 3 of the fifth representative embodiment only has a single side portion 70. Therefore, the fifth representative embodiment will be described mainly in connection with the configurations that are different from the second representative embodiment As shown in FIG. 11, in addition to the side portion 70, the bearing member 3 has a biasing portion 71 formed integrally with the side portion 70. The side portion 70 extends along the inner side surface of the concave portion 24 of the second sidewall 22 of the visor body 2. Through holes 70a (e.g., only one through hole 70a is shown in FIG. 11) are formed in the side portion 70 throughout the thickness of the side portion 70. The through holes 70a have a smaller inner diameter than the outer diameter of the projections 52d (see FIG. 6) that are used to mold the columns 26. Therefore, when the projections 52d are inserted to form the columns 26, the projections 52d cannot extend through the through holes 70a. In this way, the protruding or inserting distance of the projections 52d is limited so as to not extend beyond the side portion 70.

As described in connection with the second representative embodiment, each column 26 is configured to have a tubular portion 26a, a bottom portion 26b, and an insertion portion 26c. The tubular portion 26a extends from the first sidewall 21 of the visor body 2 to a position adjacent to the inner surface of the side portion 70 of the bearing member 3. The bottom portion 26b closes one end of the tubular portion 26a and blocks or covers the opening of the corresponding through hole 70a. The insertion portion 26c protrudes from the bottom portion 26b to the second sidewall 22, filling the through hole 70a and bonding to the inner surface of the second sidewall 22 of the visor body 2.

The biasing portion 71 extends from the upper end of the side portion 70 and is beat in an arc-shaped configuration so as to reach a position near the upper end of the side portion 70. Therefore, the biasing portion 71 may substantially cover the entire circumference length of the horizontal rod portion 4a of the support rod 4 that is inserted into the space defined by the biasing portion 71. As a result, the biasing portion 71 can reliably hold the support rod 4.

According to the fifth representative embodiment described above, the projections 52d for molding the columns 26 are inserted into the visor body 2 from the side of the first sidewall 21, but the projections 52d do not extend through the through holes 70a of the side portion 70 (i.e., extending along the concave portion 24 of the second sidewall 22 of the visor body 2) of the bearing member 3. Therefore, it is possible to prevent the second sidewall 22 of the visor body 2 from being bulged outward by an interaction of the projections 52d with the second sidewall 22 of the visor body 2. As a result, the appearance of the second sidewall 22 can be favorably maintained.

In addition, each column 26 has the bottom portion 26b that blocks or covers the through hole 70a formed in the side portion 70 of the bearing member 3. Therefore, the bearing member 3 is prevented from moving in the direction of thickness relative to the visor body 2. Consequently, the bearing member 3 is prevented from moving in the direction of thickness by the columns 26.

(Other Possible Embodiments)

The present invention may not be limited to the first to fifth representative embodiments described above but may be modified in various ways. The following are examples of other possible embodiments. However, the list is not construed to be limiting in any way or considered to encompass all of the possible embodiments within the scope of the current invention.

(1) The features of the first to fifth representative embodiments may be selectively combined in order to provide alternative arrangements or configurations of sun visors.

(2) Although both of the retainer member 60 and thee biasing member 61 of the fourth representative embodiment are described as made of spring plate for example, such as steel plate, the retainer member 60 may be molded from resin.

(3) The sun visors according to the first to fifth representative embodiment are directed to non-outer-cover type sun visors. However, in this specification, the term "non-outer-cover type sun visors" should be interpreted to include sun visors with small outer covers that are bonded to the outer surfaces of the visor bodies for improving the design appearance.

(4) The sun visors according to the first to fifth representative embodiments may be modified to have outer covers that substantially cover the entire outer surfaces of the visor bodies. Also with this configuration, it is preferable that the outer surfaces of the visor bodies do not have any insertion holes in order to prevent degradation in feeling when the operators touch the visor bodies (5) According to the sun visors of the first to fifth representative embodiments, the side portion or each side portion of the bearing member has two through holes and the visor body has two columns corresponding to the two through holes. However, the side portion or each side portion of the bearing member may have only one through hole and the visor body may have only one column corresponding to the one through hole. In such a case, in order to reliably prevent the bearing member from rotating about the column, each of the through hole and the column may have a non-circular cross section, such as a polygonal cross section. Alternatively, the biasing portion of the bearing member may be positioned adjacent to and along the upper edge of the inner space of the visor body.

This invention claims:

1. A blow molded vehicle sun visor comprising:
a visor body molded by a blow molding process and having a hollow plate-shaped configuration defining an inner space, and
a bearing member positioned within the inner space of the visor body during the blow molding process, and
a support rod inserted into the bearing member in order to pivotally support the visor body;
wherein the bearing member has at least one through hole formed therein and extending in a direction of thickness of the visor body, and
wherein the visor body has at least one column corresponding to the at least one through hole and formed integrally with the visor body during the blow molding process, and
wherein the at least one column extends though the corresponding at least one through hole of the bearing member in order to secure the bearing member to the visor body and to reinforce the visor body with respect to the direction of thickness.

2. The vehicle sun visor as in claim 1,
wherein the visor body has a first sidewall and a second sidewall opposing the first sidewall, and
wherein the at least one column is formed by at least one projection inserted into the visor body from the side of the first sidewall toward the second sidewall during the blow molding process.

3. The vehicle sun visor as in claim 2,
wherein the bearing member has a first side portion positioned along an inner surface of the first sidewall of the visor body and a second side portion positioned along an inner surface of the second sidewall of the visor body, and
wherein the at least one through hole of the bearing member includes at least one first through hole formed in the first side portion and at least one corresponding second through hole formed in the second side portion, and
wherein the at least one first though hole has an inner diameter greater than an outer diameter of the corresponding projection so as to permit insertion of the projection during the blow molding process, and
wherein the at least one second through hole has an inner diameter smaller than the outer diameter of the corresponding projection, and
wherein the at least one column formed by the at least one projection comprises a tubular portion, a bottom portion, and a filling portion, and
wherein the tubular portion extends from the first sidewall of the visor body towards the second side portion of the bearing member through the corresponding first through hole, and
wherein the bottom portion closes one end of the tubular portion on a side of the second side portion of the bearing member and blocks the corresponding second through hole, and
wherein the filling portion extends from the bottom portion to the inner surface of the second sidewall of the visor body through the corresponding second through hole.

4. The vehicle sun visor as in claim 2,
wherein the bearing member has a side portion positioned along an inner surface of the second sidewall of the visor body, and
wherein the at least one through hole of the bearing member is formed in a side portion of the bearing member and has a smaller inner diameter than an outer diameter of the corresponding projection that is inserted into the visor body from the side of the first sidewall during the blow molding process, and
wherein the at least one column formed by the at least one projection comprises a tubular portion, a bottom portion, and a filling portion, and
wherein the tubular portion extends from the first sidewall of the visor body towards the side portion of the bearing member, and
wherein the bottom portion closes one end of the tubular portion on the side of the side portion of the bearing member and blocks the corresponding through hole formed in the side portion of the bearing member, and
wherein the filling portion extends from the bottom portion to the inner surface of the second sidewall of the visor body through the corresponding through hole formed in the side portion of the bearing member.

5. The vehicle sun visor as in claim 1,
wherein a plurality of through holes is provided in the bearing member, and
wherein a corresponding plurality of columns are provided and are spaced apart from each other within a plane in which the visor body extends.

6. A vehicle sun visor comprising:
a hollow visor body defining an inner space and having a first sidewall and a second sidewall opposing the first sidewall, and
a bearing member disposed within the inner space of the visor body and having at least one through hole formed therein, and
a support rod inserted into the bearing member via the visor body in order to pivotally support the visor body, and at least one column formed integrally with at least one of the first or second sidewalls of the visor body and engagingly inserted into the corresponding through hole of the bearing member so that the bearing member is prevented from moving at least within a plane substantially parallel to the first and second sidewalls of the visor body.

7. The vehicle sun visor as in claim 6, wherein the at least one column has a first end joined to the first sidewall and a second end opposite to the first end and joined to the second sidewall.

8. The vehicle sun visor as in claim 7 wherein the at least one column comprises a tubular portion with an open end defining the first end and a closed end defining the second end.

9. The vehicle sun visor as in claim 7, wherein the bearing member has a first side portion and a second side portion opposing the first side portion, and wherein the first side portion is positioned along an inner surface of the first sidewall of the visor body, and wherein the second side portion is positioned along an inner surface of the second sidewall of the visor body, and wherein the at least one through hole of the bearing member includes at least one first through hole formed in the first side portion and a corresponding at least one second through hole formed in the second side portion.

10. The vehicle sun visor as in claim 9, wherein an inner diameter of the at least one first through hole is substantially equal to an inner diameter of the at least one second through hole, and wherein an outer diameter of the at least one column is substantially equal to or less than the inner diameter of the at least one first through hole, so that the column extends through both the corresponding first through hole and the second through hole.

11. The vehicle sun visor as in claim 9, wherein the at least one first through hole has a first diameter substantially equal to or greater than an outer diameter of the at least one column, wherein the at least one second through hole has a second diameter smaller than the outer diameter of the at least one column, so that the at least one second through hole is blocked by the second end of the corresponding column, wherein the second end of the at least one column has an extension extending from the second end to the second sidewall of the visor body via the corresponding second through hole.

12. The vehicle sun visor as in claim 7, wherein the bearing member has a side portion positioned along an inner surface of the second sidewall of the visor body, and wherein the at least one through hole has an inner diameter substantially equal to or smaller than an outer diameter of the corresponding column, so that the at least one through hole is blocked by the second end of the corresponding column, and wherein the second end of the at least one column has an extension extending from the second end to the second sidewall of the visor body via the corresponding through hole.

\* \* \* \* \*